US008566783B2

(12) United States Patent
Li et al.

(10) Patent No.: US 8,566,783 B2
(45) Date of Patent: Oct. 22, 2013

(54) DETERMINING A NAVIGATION PATH FOR A CONSTRAINT LANGUAGE EDITOR

(75) Inventors: Ying Li, Beijing (CN); Jing Luo, Beijing (CN); Jia Yin Mao, Beijing (CN); Jie Qiu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1056 days.

(21) Appl. No.: 12/362,829

(22) Filed: Jan. 30, 2009

(65) Prior Publication Data

US 2009/0199156 A1    Aug. 6, 2009

(30) Foreign Application Priority Data

Jan. 31, 2008  (CN) .......................... 2008 1 0008950

(51) Int. Cl.
    *G06F 9/44*    (2006.01)
(52) U.S. Cl.
    USPC ............ 717/104; 717/105; 717/108; 717/110
(58) Field of Classification Search
    USPC ............................................. 717/104–113
    See application file for complete search history.

(56) References Cited

U.S. PATENT DOCUMENTS

| 5,499,371 | A * | 3/1996 | Henninger et al. ........... 717/108 |
| 7,814,427 | B2 * | 10/2010 | Cook et al. ..................... 715/763 |
| 2002/0104068 | A1 * | 8/2002 | Barrett et al. ................. 717/104 |
| 2003/0078923 | A1 * | 4/2003 | Voss et al. ........................ 707/7 |
| 2004/0216085 | A1 * | 10/2004 | Wilson et al. ................. 717/108 |
| 2005/0159935 | A1 | 7/2005 | Orii |
| 2005/0262115 | A1 | 11/2005 | Hu |
| 2006/0064667 | A1 * | 3/2006 | Freitas .......................... 717/104 |
| 2006/0129974 | A1 * | 6/2006 | Brendle et al. ............... 717/108 |
| 2006/0150169 | A1 * | 7/2006 | Cook et al. ..................... 717/156 |
| 2006/0195460 | A1 * | 8/2006 | Nori et al. ...................... 707/100 |
| 2007/0056018 | A1 | 3/2007 | Ridlon |
| 2008/0059944 | A1 * | 3/2008 | Patterson et al. ............. 717/104 |

OTHER PUBLICATIONS

Kim et al., A UML-based language for specifying domain-specific patterns, Jan. 5, 2004, Journal of Visual Languages & Computing.*
Alan Borning, The Programming Language Aspects of ThingLab, a Constraint-Oriented Simulation Laboratory, Jun. 9, 2000, Xerox Palo Alto Research Center.*
Turner, et al., "Visual Constraint Diagrams: runtime conformance . . . implementations", Proceedings from the IEEE International Conference on Automated Software Engineering, pp. 271-276, Dec. 31, 2003.
Wahler, et al., Model-driven Constraint Engineering, IBM, Zurich, pp. 1-15, In MoDELS Wrkshp on OCL for (Meta-) Models in Multiple Application Domains, pp. 111-115, Dec. 2006.

(Continued)

*Primary Examiner* — Lewis A Bullock, Jr.
*Assistant Examiner* — Tina Huynh
(74) *Attorney, Agent, or Firm* — Jon A. Gibbons; Fleit Gibbons Gutman Bongini & Bianco PL

(57) ABSTRACT

A method and navigation helper for generating constraint language codes for navigation in a constraint language editor. The constraint language editor generates model/instance-related constraint expressions according to the loaded model/instance and related constraints. The navigation is a path implementing the constraints. The method includes parsing the loaded model/instance; calculating a possible association related to the element through the type of the navigation-related element in the model/instance; and calculating a possible navigation path according to the association. A method for generating constraint language codes in a constraint language editor and the constraint language editor includes loading the model/instance; loading constraint patterns for storing parameters and a constraint code template; invoking corresponding helpers, according to the types of parameters stored in the constraint patterns; and generating constraint codes according to the generated parameters and the constraint code template.

18 Claims, 13 Drawing Sheets

(56) References Cited

OTHER PUBLICATIONS

Clancy, et al., "Divide and Conquer: A component-based qualitative simulation algorithm", Qualitative Reasoning Group Papers, Northwestern University, 1998.

V. Puig, et al., Constraints and Composite Objects, Proceedings of the 7th International Conference on Database & Expert Systems Applications, pp. 521-530.

W. Yang, et al. "Rough Set Model for Constraint-based Multi-dimensional Association Rule Mining", Advances in Intelligent IT, vol. 138, 2006.

J. Kodumal, "Program Analysis with Regularly Annotated Constraints", Submitted Dissertation to the University of California, 2006.

* cited by examiner

DETERMINING A NAVIGATION PATH FOR A CONSTRAINT LANGUAGE EDITOR

CROSS REFERENCE TO RELATED APPLICATION

This application claims priority under 35 U.S.C. 119 from Chinese Patent Application No. 200810008950.3 filed Jan. 31, 2008, the entire contents of which are incorporated herein by reference.

BACKGROUND OF THE INVENTION

1. Field of the Invention

The invention generally relates to the field of computer modeling and the corresponding constraint language, and particularly relates to a method and constraint language editor for generating model-related constraint expressions.

2. Description of Related Art

Computer modeling, especially software modeling, mainly refers to object modeling in the field of software engineering, such as Unified Modeling Language (UML) and Eclipse Modeling Framework (EMF). It describes an application program at a higher level, so that the implementation codes of the application program can be generated in part or entirely. Most models are composed of a plurality of block and arrow diagrams and the accompanying texts. Information expressed by such models is incomplete, informal, and inaccurate, sometimes even self-contradictory. A number of deficiencies in a model are caused by the limited expression ability of the utilized diagrams. Sometimes, some conditional statements cannot be expressed by diagrams only, although the statements should have been apart of a complete specification. For example, if the UML modeling is performed on the relationship between a flight and passengers, the association between a flight and passengers may represent that the passengers of a flight can be a certain group. Such a one-to-many association is a multirelation, which means that the number of passengers is infinite. Actually, however, the number of passengers can not exceed the number of seats of the plane servicing this flight. Nevertheless, such a constraint cannot be expressed on a UML diagram. Here it is necessary to attach a constraint language therein, such as Object Constraint Language (OCL), Schematron, etc.

Taking OCL as an example, in the OCL specification, it is mentioned that: A UML diagram, such as a class diagram, is typically not refined enough to provide all the relevant aspects of a specification. There is, among other things, a need to describe additional constraints about the objects in the model. Such constraints are often described in natural language. Practice has shown that this will result in ambiguities. In order to write unambiguous constraints, so-called formal languages have been developed. The disadvantage of traditional formal languages is that they are usable to persons with a strong mathematical background, but difficult for the average business or system modeler to use. OCL has been developed to fill this gap. It is a formal language that remains easy to read and write. OCL supports UML by providing expressions, which have neither ambiguity of natural languages nor inherent difficulty in using complex mathematical expressions.

Using expressions written by a mathematics-based, accurate language, such as OCL, provides a number of additional advantages for a system model expressed by a diagram, for example, such expressions will not be construed as different meanings by different roles (such as an analyzer and a programmer). They are explicit and make the model more accurate and detailed. The expressions can also be checked by some automated tools to ensure they are correct and consistent with other elements in the model, so that the code generation becomes more effective. However, the model described simply by means of expressions is often hard to understand. For example, although source codes can be considered as an ultimate model of software, most people would like to see a diagrammatic model when dealing with a system at the first time. An advantage of line, block and arrow diagrams is that the meaning may be easy to understand. For software developers, combining and utilizing UML and OCL brings out the best in each other. A large number of different diagrams and OCL expressions can be combined to express a model. It is noted that for a complete model, the diagrams and expressions are indispensable. Without OCL expressions, the model may be not consummate enough; without UML diagrams, the OCL expressions may reference an element model that does not exist—since there is no mechanism in OCL to represent class and association. Therefore, a model can be expressed completely only by combining diagrams and constraints.

Four features of OCL are introduced in detail in Jos Warmer, Anneke Kleppe "Object Constraint Language, Getting Your Models Ready for MDA, Second Edition".

1. OCL is Both a Query Language and a Constraint Language.

A constraint is a restriction on one or more values of (part of) an object-oriented model or system. All values in a UML class diagram can be constrained, and the way to express these constraints is OCL. In the UML 2 standard, not only used for writing constraints, OCL is also used for writing expressions for any elements in a UML diagram. Each OCL expression can direct to a value or an object in the system. Since OCL expressions can derive any value or a set of values in a system, it has the same ability as SQL.

2. OCL is Mathematics-Based, but Uses No Mathematical Symbol.

The foundation of OCL is the set theory and predication logic in mathematics, and OCL has a formal mathematical semantic. It, however, does not use a certain type of mathematical symbols. The reason is that although mathematical symbols can express things explicitly and unambiguously, they can be read only by just a few experts. Mathematical symbols are therefore not suitable for a widely-used standard language. Natural language is most understandable, but is unclear and indistinct and cannot be handled by computers automatically. OCL takes a compromise between natural language and mathematical symbols, which expresses the same concepts as in mathematics by utilizing conventional ASCII characters. If you do not like the current OCL expression method, the OCL specification also allows you to define your own OCL symbol set. This is reasonable, since OCL has an explicit mathematical semantic.

3. Strong Typed Language

OCL is a typed language. The values of any expressions are belonging to the same type. This type can be a predefined standard type, such as Boolean or Integer, or elements in a UML diagram, such as objects, or a set of these elements, such as a set of objects, a package, an ordered set, etc.

4. Declarative Language

What is opposite with respect to declarative language is procedural language. A procedural language, such as Java, is a kind of programming language, which describes steps of performing actions. In a declarative language, however, its expressions only describe "what" to do rather than "how" to do. In order to guarantee this, OCL expressions have no side effect, i.e. calculating the value of an OCL expression will not influence the system status at all.

Since OCL is a declarative language for describing rules applied to UML models, expressions in UML are advanced to the field of pure modeling, without paying attention to the implementation details and implementation languages. Expressions define values of a system at a higher abstract level, thereby preserving the accuracy of 100%. OCL is also a navigation language for graph-based models, but the text expressions for constraints are complex. The constraint expressions are in the form of text, so that a user can only write them with the knowledge of the syntax structure. A user, however, is usually not familiar with these constraint languages, so that writing expressions by them may take a great effort with a poor quality. Current OCL editors only have limited support for expression generation, wherein there is no navigation expression editing for complex meta-models. Furthermore, an expression designer must face OCL syntax in addition to meta-models. The term "navigation" will be described in detail hereinbelow.

Typical OCL editors mainly focus on the constraint syntax, thus causing very bad user experience. A user needs to face a text-based constraint editing user interface. The user still needs to know the OCL syntax to write expressions, although the editor can help user complete expressions automatically in part, for example, in current OCL editors, after the user selects an element, he can only be prompted the attributes and methods of the element and the direct association elements.

FIG. 1 illustrates an exemplary diagram of an SQL Statement Editor (RAD). In the figure, RAD provides a "model-level" view and frees user from the burden of SQL statement editing. Namely, a user only needs to perform model editing without worrying about the SQL syntax. After the user finishes model design, the SQL syntax will be generated automatically by the application. In prior art, however, there is no similar tool for automatically generating OCL expressions for UML/EMF.

Schematron (standing for XQuery, XPath, XSLT) and OCL can provide comparable constraint semantic but in different syntaxes. In prior art, there is no uniform tool to support both types of language editing. For example, referring to FIG. 2, an example is shown of two different constraint syntaxes sharing the same model and constraint semantics. FIG. 2 is a particular instance about navigation. The top half of the figure is used for describing the instance of application program deployment, in which the designer likes to add a constraint that the name of the database connected to the data source DataSourceUnit of WAS 6.0 AppServer (WAS is abbreviation of WebSphere Application Server) is equal to "tradedb". Namely, the constraint semantic is that the data source requires that the connected database is tradeDB. Starting from the data source DataSourceUnit, the constraint needs to navigate to its connected database (DB2 8.1 Database), next to the name of the database, and finally it is required that the name is equal to "tradedb". The navigation process in the figure is from the element DB2Database/DB2 Database (201) to the element DB2 Database (202), and the solid arrow connecting 201 and 202 is navigation. The semantic can be implemented by several different syntaxes, such as OCL expressions and Schematron expressions. In the bottom half of the figure, the constraint is expressed by two constraint languages, OCL and Schematron, respectively. The navigation-related parts in the expressions are marked by black blocks, wherein, the OCL expression in block 210 and the Schematron expression in block 220 are necessary for navigation. It can be seen that in a complete constraint expression, the navigation expression occupies a majority of space. While writing constraint expressions, a user needs to find a navigation method/association in a complete element list provided by the editor, and needs to perform type conversion manually. This requires many steps, thus the navigation helping becomes particularly important. In current editors, helping for navigation is not provided, and a user needs to implement a navigation path step-by-step. Moreover, some valid navigation paths may not be provided. Therefore, there is a need for a novel technology for extracting constraint semantic, providing navigation helping, and generating different constraint codes for different syntaxes.

SUMMARY OF THE INVENTION

According to one aspect of the present invention, in a method for helping generate constraint language codes for navigation in a constraint language editor, the constraint language editor is used for generating, according to the loaded model/instance and the related constraints, model/instance-related constraint expressions. The navigation, which includes a sequence of model/instance elements, is a path implementing the constraints. The method includes: parsing the loaded model/instance; calculating, through the type of the navigation-related element in the parsed model/instance, a possible association related to the element; and calculating a possible navigation path according to the association.

According to another aspect of the present invention, a navigation helper for helping generate constraint language codes for navigation in a constraint language editor, wherein the constraint language editor is used for generating, according to the loaded model/instance and the related constraints, model/instance-related constraint expressions, the navigation, which includes a sequence of model/instance elements, is a path implementing the constraints. The navigation helper includes: a model parser for parsing the loaded model; an instance parser for parsing the loaded instance; an association database for storing the data related to the association in the loaded model/instance; and a navigation path calculator for calculating, through the type of the navigation-related element in the parsed model/instance, a possible association related to the element, and calculating a possible navigation path according to the association.

According to still another aspect of the present invention, a method for helping generate constraint language codes in a constraint language editor, wherein the constraint language editor is used for generating, according to the loaded model/instance and the related constraints, model/instance-related constraint expressions, includes the steps of: loading the model/instance; loading constraint patterns, the constraint patterns for storing parameters related to the constraint semantic and a constraint code template; invoking, according to the types of parameters stored in the constraint patterns, the corresponding helpers, for generating the particular constraint parameters related to the loaded model/instance based on the constraint patterns; and generating constraint codes according to the generated constraint parameters and the constraint code template in the constraint patterns.

According to still another aspect of the present invention, a constraint language editor for generating, according to the loaded model/instance and the related constraints, model/instance-related constraint expressions, includes: constraint patterns for storing parameters related to the constraint semantic and a constraint code template; helpers for generating the particular constraint parameters related to the loaded model/instance based on the constraint patterns; and a code generator for generating constraint codes according to the constraint parameters generated by the helpers and the constraint code template in the constraint patterns.

The constraint language editor of the present invention and its method for generating model-related constraint expressions can extract constraint semantic, provide users with navigation helping, and generate difference constraint codes for different syntaxes, so that users only need to focus on the model design without the need to know the particular constraint syntax of respective constraint language, thus reducing the burden of users manually writing navigation expressions and improving the working efficiency.

BRIEF DESCRIPTION OF THE DRAWINGS

The invention and its exemplary mode will be best appreciated from the reading of the following detailed description of the illustrative embodiments taken in conjunction with the drawings, in which.

It is noted that the same or similar labels designate the same or similar elements or components throughout the figures.

DETAILED DESCRIPTION OF PREFERRED EMBODIMENTS

The exemplary embodiments of the invention will be described below in conjunction with the accompanying figures. For clarity and simplicity, not all features of the actual implementation are described in the specification. However, it will be appreciated that many implementation-specific decisions must be made in the procedure of developing any of such actual embodiments in order to realize the particular objectives of developers, for example complying with those limiting conditions in related to systems and businesses, wherein the limiting conditions may be varied depending on the implementation. Further, it will be appreciated that although the development effort may be complicated and time-consuming, such development effort is only a routine task for those skilled in the art that benefit from this disclosure.

It is further noted that, in order not to obscure the invention by unnecessary details, only the apparatus structures and/or processing steps needed for an understanding of the scheme according to embodiments of the invention are shown in the accompanying figures, while other details not so needed are omitted.

In order to better understand the present invention, taking the OCL editor as an example, it is initially explained why a user cannot write model-related constraints under the help of a traditional OCL editor. A traditional OCL editor can generate partial expressions with OCL syntax information and model/instance information. Wherein the OCL syntax information comprises: operator, such as +, <,>; set operation, such as ->any( ), ->select( ); and type conversion, such as oclAsType( ). The model/instance information comprises: attributes of objects; operations of objects; associations between objects; and generalizations between objects. A traditional OCL editor cannot generate complete and valid expressions for a user without calculating model and instance information.

In particular, in the case that inheritance occurs, since the OCL editor cannot find the navigation to children elements or parent elements, it cannot provide all possible navigation paths without calculation. The OCL editor cannot help a user generate complex navigation expressions, such that the user has to manually complete navigation expressions with his OCL syntax knowledge according to the requirements of model design.

Figure 1:
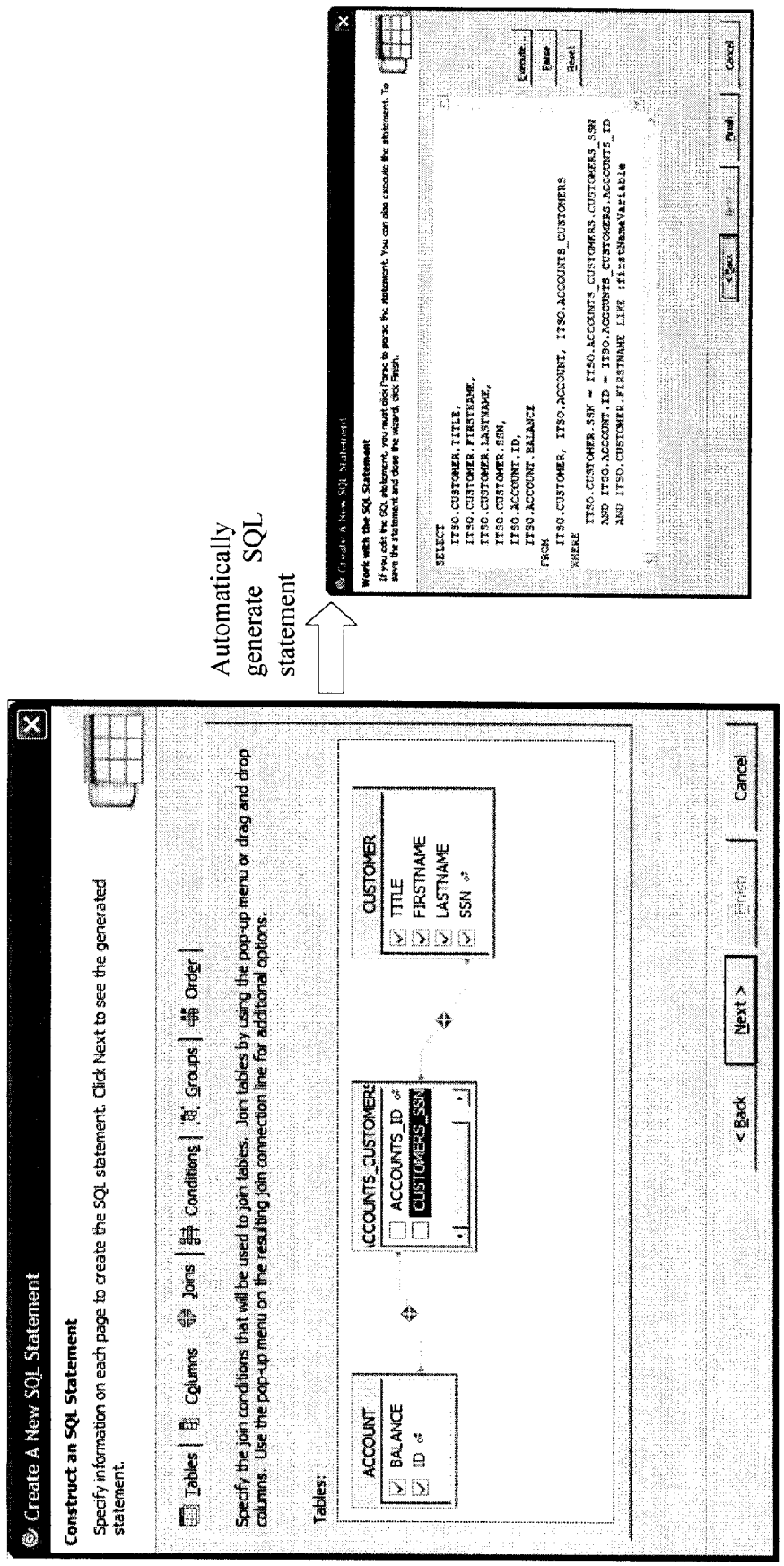
FIG. 1 illustrates an exemplary diagram of a SQL Statement Editor (RAD)
Figure 2:
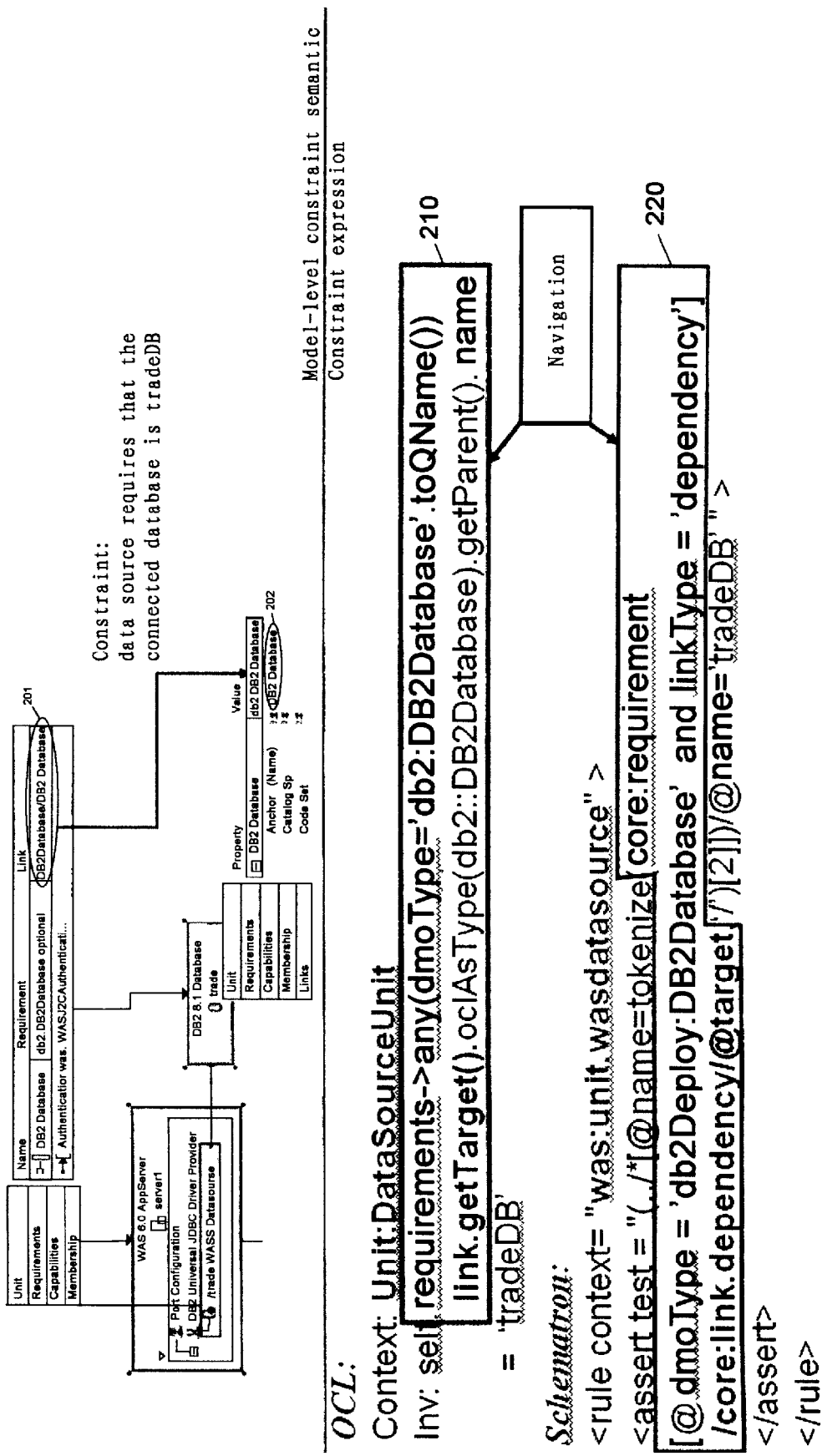
FIG. 2 illustrates an example of two different constraint syntaxes sharing the same model and constraint semantics.
Figure 3A:
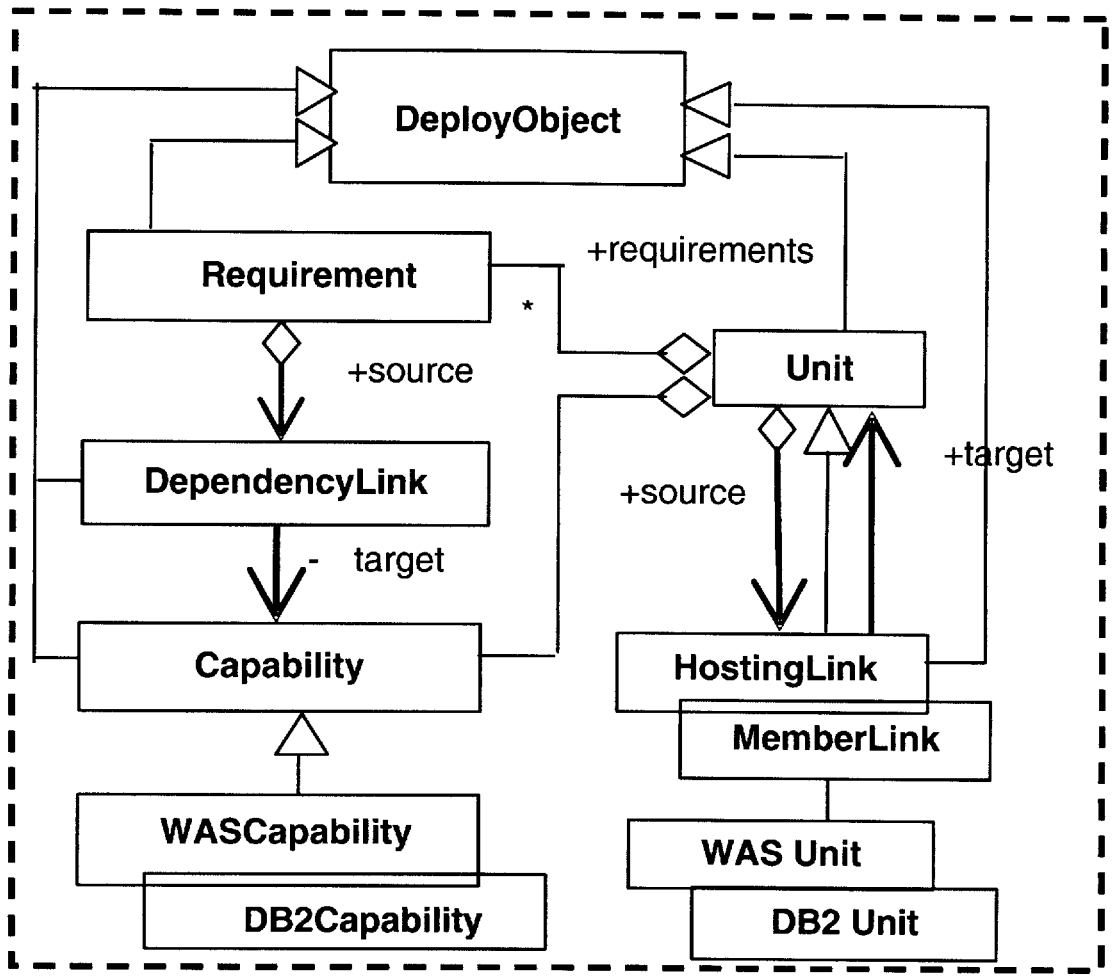
FIGS. 3A-3C set forth various navigation implementations indifferent cases more clearly.
Figure 3B:
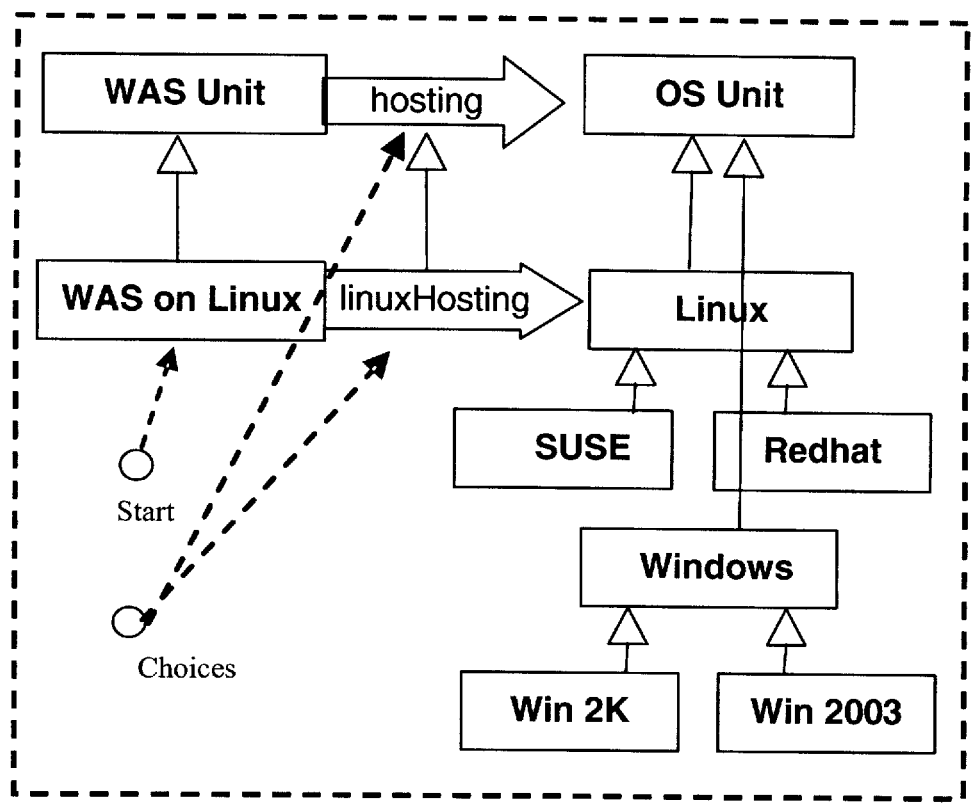
Figure 3C:
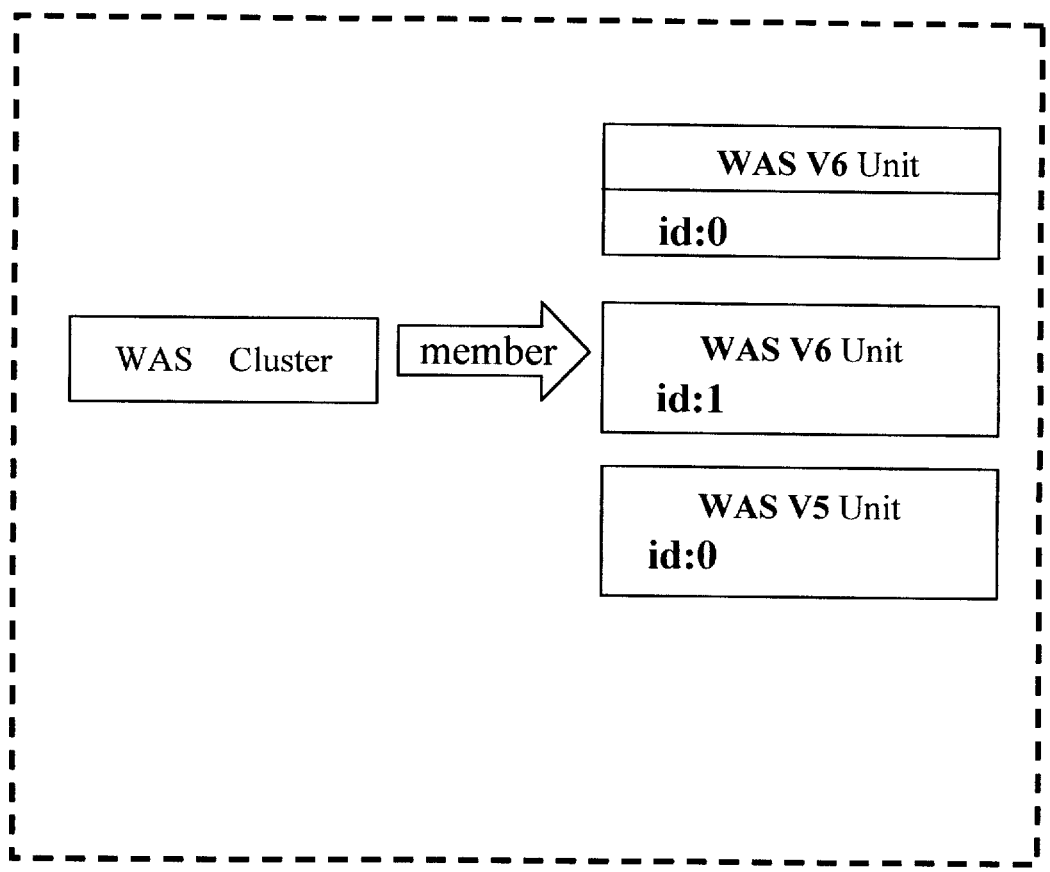

It can be seen from the above description that navigation is important and difficult for OCL editors. The reason is that, when a user is writing a model constraint, it is very common to use navigation, which is the most complicated part in an OCL expression. Referring to FIGS. 3A-3C, lists are shown of navigations at three different levels. The various navigation implementations in different cases are set forth more clearly below with reference to FIGS. 3A-3C. FIG. 3A is a model related to application program deployment, in which it contains several model elements, such as DeployObject, Unit, etc., and relationships between elements, such as inheritance, association. It can be seen that in such a model there may be a plurality of navigation paths from one element to another. Some paths contain multiple relationships, while some paths even contain different types of relationships, which form complex navigations. Due to the complexity of the model, the navigation may need to pass multiple elements. For example, referring to FIG. 3A, consider the following navigation: Unit-.fwdarw.Requirement.fwdarw.De-pendencyLink.fwdarw.Capability.fwda rw.Un-it. It is clear that the expression of the navigation will be redundant and complicated.

FIG. 3B depicts the inheritance on association relationship, which demonstrates that, due to the nature of object-oriented inheritance, the type of the end point of navigation may have multiple choices: parent class or child class. For example, the combination of inheritance and association is comprised in FIG. 3B. As shown, the relationship of "linuxHosting" is inherited from the relationship of "hosting"; "WAS on Linux" is inherited from "WAS Unit". In this model, a navigation path starting from an element may cover multiple levels, for example, when starting from "WAS on Linux", the path may reach elements at different levels by selecting "hosting" or "linuxHosting". Therefore, an OCL editor should provide such a navigation helper that can find out and sort elements and attributes at different levels. When "WAS on Linux" is taken as the starting element of navigation, the navigation helper should be able to list two choices of "Linux" and "OS Unit", since "Linux" is inherited from "OS Unit".

FIG. 3C depicts a model containing set relationship, which demonstrates the case that the end point of navigation is an element set. In the case, the navigation belongs to different levels according to different destinations. The element of "WAS Cluster", as a set element, contains other three model elements: "WAS V6 Unit (id: 0)", "WAS V6 Unit (id: 1)", and "WAS V5 Unit (id: 0)", i.e. the three model elements are members of the element of "WAS Cluster". Therefore, starting from "WAS Cluster", a path may reach different types of elements. Both FIG. 3B and FIG. 3C present a case that a path starting from an element may reach an uncertain destination. In such a case, it is necessary for the navigation helping tool to make a determination or provide users with appropriate choices and prompts. Therefore, not only does the navigation need to find out every element in a set, but also find out their common parent class, as the constraint on an element set is often applied to the level of the parent class with common attributes.

It can be seen from above that, when writing expressions in a constraint language such as OCL, navigation is common and complicated. Navigation can be implemented by: associations, attributes, methods defined on models and instances; set operations defined by the constraint language; and type conversion codes. Navigation codes are usually mixed with other operators and operands (model elements and attributes). Also, in practice, a model designer is often familiar with the model rather than the syntax of a constraint language (such as set operation, type conversion), or is familiar with only one constraint language rather than applying other constraint languages. Therefore, navigation helping is necessary for users to conveniently write the required constraint expressions, navigation helping should be integrated with syntax helping to provide as a utility tool, and navigation helping is an indispensable function to realize the language-independent expression generation. The constraint language editor according to an embodiment of the present invention can provide users with navigation helping, thereby reducing the burden of users manually writing navigation expressions, and improving the working efficiency.

After demonstrating the importance and complexity of navigation helping in the constraint language editor, how to implement a constraint language editor and a navigation helper therein by the invention will be described in detail as below. In the present invention, "pattern" is used for separating constraint semantic from its implemented constraint language. The constraint semantic comprises: model element/ attribute, navigation (comprising instance-level navigation and model-level navigation), operator, user-defined value (constant), and set operation. The invention can help to perform navigation detection, classification, and expression generation based on model and instance information. One embodiment of the invention can detect navigation candidates based on model and instance information, filter the navigation candidates using pattern information about navigation (for example, the navigation destination must be type of OS Unit, and other types of navigation destinations are discarded), classify the navigation candidates according to the model/instance level, inheritance level, and decide a navigation path with user selection. A constraint code template and a code generator could also be used to transform the determined constraint semantic to constraint expressions in different languages, such as OCL or Schematron.

Figure 4:
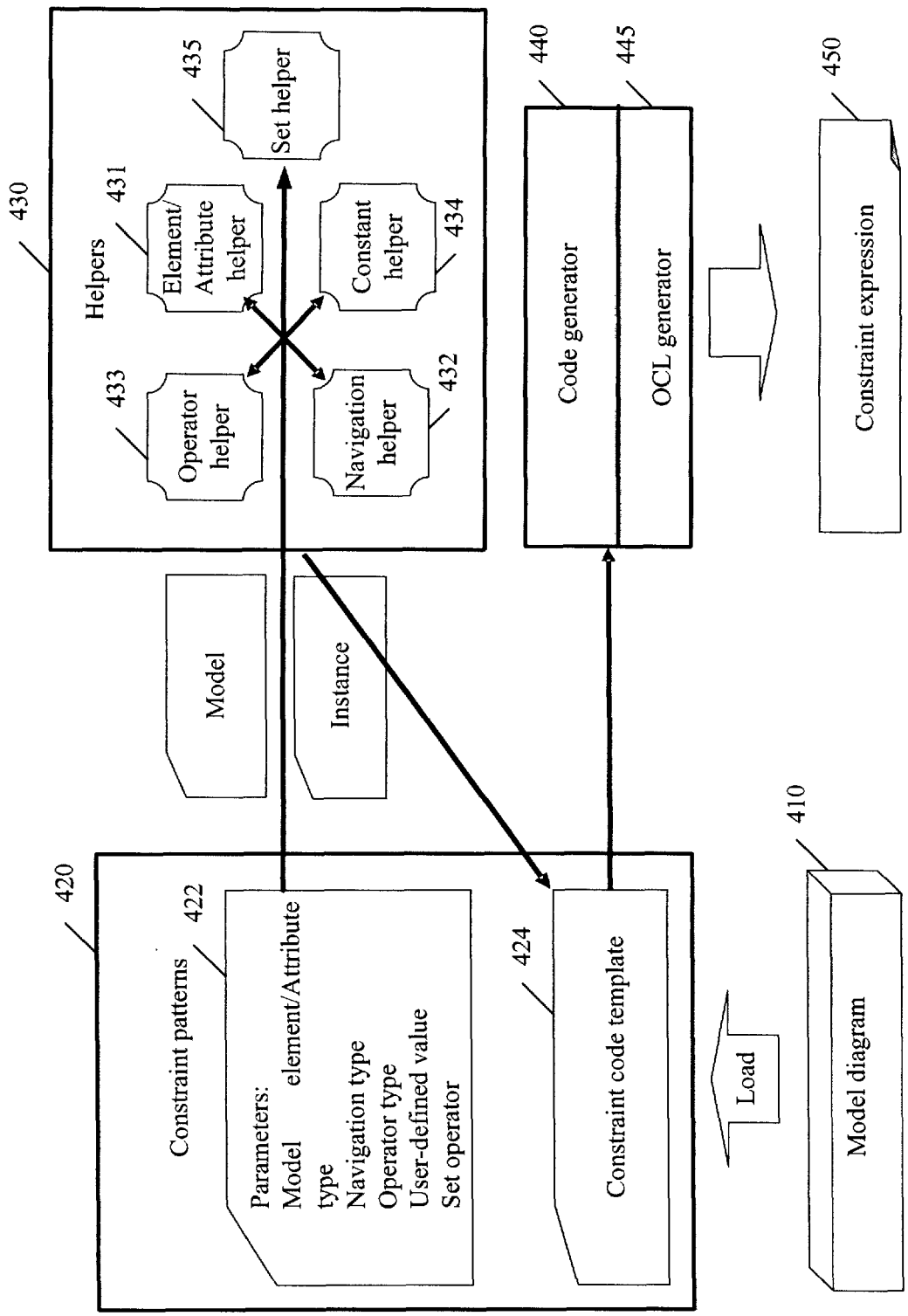
FIG. 4 is the architecture of the constraint language editor according to an embodiment of the invention.

Next referring to FIG. 4, there is shown the architecture of the constraint language editor according to an embodiment of the invention. In conjunction with FIG. 4, the operating principle of the constraint language editor according to an embodiment of the invention can be readily appreciated by those skilled in the art. In FIG. 4, a constraint language editor comprises constraint patterns 420, helpers 430, and a code generator 440. The constraint patterns 420 comprise the following parameters 422 related to constraint semantic: model element/attribute type, navigation type (comprising instance-level navigation sub-type and model-level navigation sub-type), operator type, user-defined value (constant), and set (referring to model element/attribute set) operator. The constraint patterns 420 may further comprise a constraint code template 424, in which the templates of constraint codes are stored. After the user determines the necessary parameters, thus determining the constraint semantic, the needed constraint language codes can be generated based on the templates. The constraint language editor loads a model diagram 410 and passes the models and instances therein to the helpers 430 along with the parameters of the constraint patterns 420.

The helpers 430 comprise an element/attribute helper 431, a navigation helper 432, an operator helper 433, a constant helper 434, and a set helper 435. The above five helpers are used for helping generate the above five parameters respectively, for example, they can automatically select available related parameters based on pre-defined rules, and, if a plurality of possible parameters exist, list the parameters for user selection, for example by way of a window. The five helpers may not be needed at the same time. The needed parameters may be determined according to the defined constraints. After the needed parameters are determined and passed back to the constraint patterns 420 by the helpers 430, the constraint patterns 420 pass the generated parameters and the templates of constraint codes corresponding to the constraint semantic to the code generator 440, thereby generating constraint expressions 450. In this embodiment, the code generator 440 comprises an OCL generator, so that it can generate constraint expressions in OCL language. It can be appreciated by the skilled in the art that the code generator 440 may also support other languages (such as Schematron), so that it can generate constraint expressions in other languages. It is noted that the constraint pattern type mentioned herein is generic attribute constraint pattern, which only contains some basic patterns, such as "equal", "inRange", "derive", while the patterns related to application level semantic are not included in the present invention. It is possible to perform parameter type verification based on the selected operator through the constraint patterns.

Figure 5:
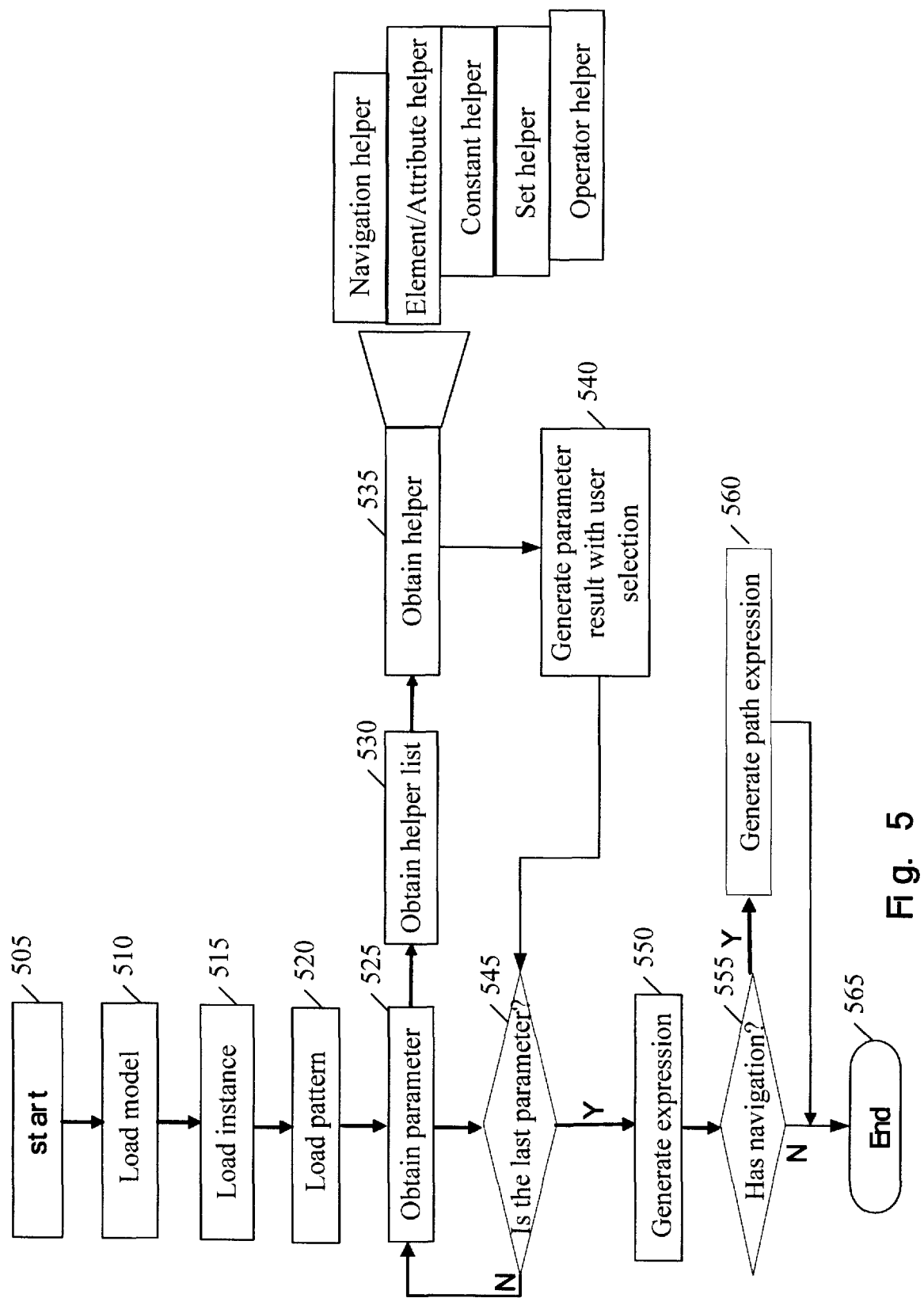
FIG. 5 depicts a flowchart of the workflow of a method for generating constraint expressions according to an embodiment of the invention.

Referring to FIG. 5, there is a depiction of a flowchart of the workflow of a method for generating constraint expressions according to an embodiment of the invention. The method starts at Step 505 and proceeds to Step 510, 515, and 520, of which, at Step 510, models are loaded; at Step 515, instances are loaded; at Step 520, patterns are loaded. At Step 525, a parameter is obtained from the loaded patterns. The method proceeds to Step 530, at which a helper list is obtained. At Step 535, the needed helper is determined according to the obtained parameter. Said helper comprises one of the above five helpers: element/attribute helper, navigation helper, operator helper, constant helper, and set helper. At Step 540, the parameter result is generated with user selection. The method proceeds to Step 545, at which it is determined whether the parameter is the last one. If not, the method loops back to Step 425, at which the next parameter is obtained from the loaded patterns.

If at Step 545 it is determined that the parameter is the last one, the method proceeds to Step 550, at which a constraint expression is generated. At Step 555, it is determined whether there is navigation in the constraint. If so, the method proceeds to Step 560, at which a path expression is generated by the navigation helper. Afterwards, the method proceeds to Step 565, at which the method ends. If there is no navigation in the constraint, then the navigation helper is not needed any more, and the method ends directly (Step 565).

Figure 6:
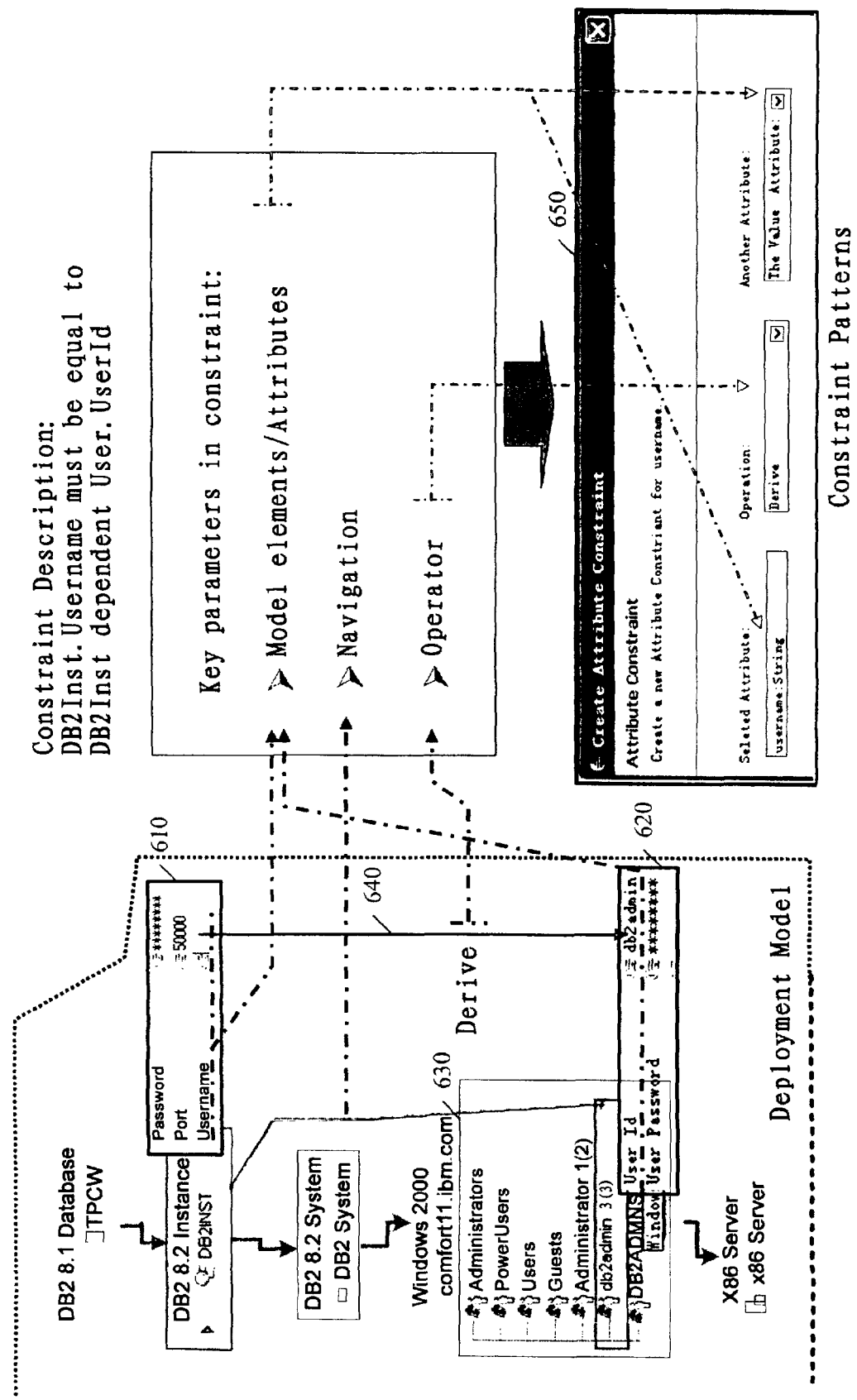
FIG. 6 depicts an implementation of constraint abstraction by the constraint language editor according to an embodiment of the invention.

A simple implementation of constraint abstraction by the constraint language editor according to an embodiment of the invention is illustrated hereinbelow by means of an example in conjunction with FIG. 6. On the left side of FIG. 6, there is an instance diagram for depicting application program deployment. Assume that a constraint can be described as: DB2Inst.Username must be equal to DB2Inst dependent User.UserId. It can be seen therefrom that the key parameters in the constraint relate to: model element/attribute, navigation, and operator. In an embodiment of the invention, Block 610 illustrates the user name of DB2Inst, i.e. DB2Inst.Username; Block 620 illustrates the DB2Inst dependent User.UserId. Both are the model elements/attributes in the constraint.

The solid arrow 630 represents the navigation from the element DB2Inst to the element db2admin, which is the navigation parameter in the constraint. The solid arrow 640 represents the Derive relationship from Username to UserId, which is the operator parameter in the constraint. Thus, in the constraint language editor according to an embodiment of the invention, a user interface of constraint patterns is illustrated, as shown in Block 650. Block 650 illustrates a window diagram for creating attribute constraint, in which a user is prompted of a new attribute constraint to be created for Username. In the window diagram, two attribute constraints and the operator parameter may be selected by the user. After the user determines these parameters, a navigation path can be automatically calculated by the constraint language editor, and if there are multiple possible navigation paths, the final selection is made by the user. The process of navigation path calculation will be described in detail hereinbelow. The interface is visible and easy to operate, so that the user only needs to focus on the model design, without the need to know the particular constraint syntax. After determining these parameters and the navigation path, the final constraint expression may be obtained by the constraint code templates and the code generator.

Figure 7:
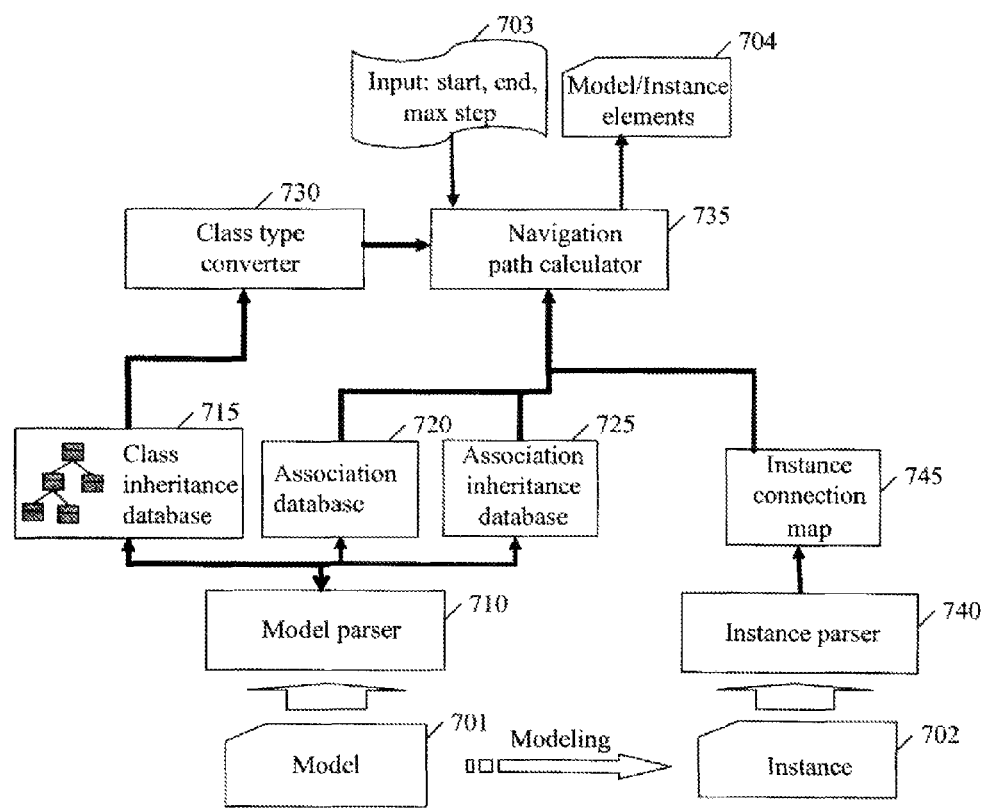
FIG. 7 depicts the architecture of a navigation helper in the constraint language editor according to an embodiment of the invention.

The constraint language editor according to an embodiment of the invention and its workflow are described in detail hereinabove, and the architecture and operating principle of the navigation helper in the constraint language editor will be introduced in detail below in conjunction with FIG. 7. FIG. 7 is the architecture of a navigation helper according to an embodiment of the invention. The navigation helper comprises a model parser 710, a class inheritance database 715, an association database 720, an association inheritance database 725, a class type converter 730, a navigation path calculator 735, an instance parser 740, and an instance connection map 745. In operation, a model 701 can be loaded into the model parser 710, which then parses the loaded model, and determines to access one of the class inheritance database 715, association database 720, and association inheritance database 725, according to the parsed model, in order to select the corresponding database from the three databases for reading available data list. The reading of the three databases is based on the loaded model. For example, the corresponding class inheritance database 715 or association inheritance database 725 is to be read as long as there is class inheritance or association inheritance in the model diagram.

In the case of reading data from one of the association database 720 and association inheritance database 725, the read association data or association inheritance data is loaded to the navigation path calculator 735 to calculate the final navigation path 704 comprising model/instance elements, wherein the navigation path comprises a sequence of model/instance elements. In the case of reading data from the class inheritance database 715, the read class data is performed type conversion by the class type converter 730, and loaded to the navigation path calculator 735. By the navigation path calculator 735, the user may further input other parameters 703 to the navigation path calculator 735, such as navigation starting point, navigation ending point, max step of navigation (i.e. steps of elements passed by the navigation path), etc., so as to make the navigation path generated by the navigation path calculator 735 more accurate, to accord with the requirements of model design by the user.

The instance 702 modeled from the model 701 may be loaded into the instance parser 740. The instance parser 740 parses the loaded instance. The parsed instance can be calculated based on the instance connection map 745 that shows the relationships between instances, to obtain the connected instance and load it to the navigation path calculator 735 to calculate the final navigation path 704, which comprises a sequence of model/instance elements.

Figure 8:
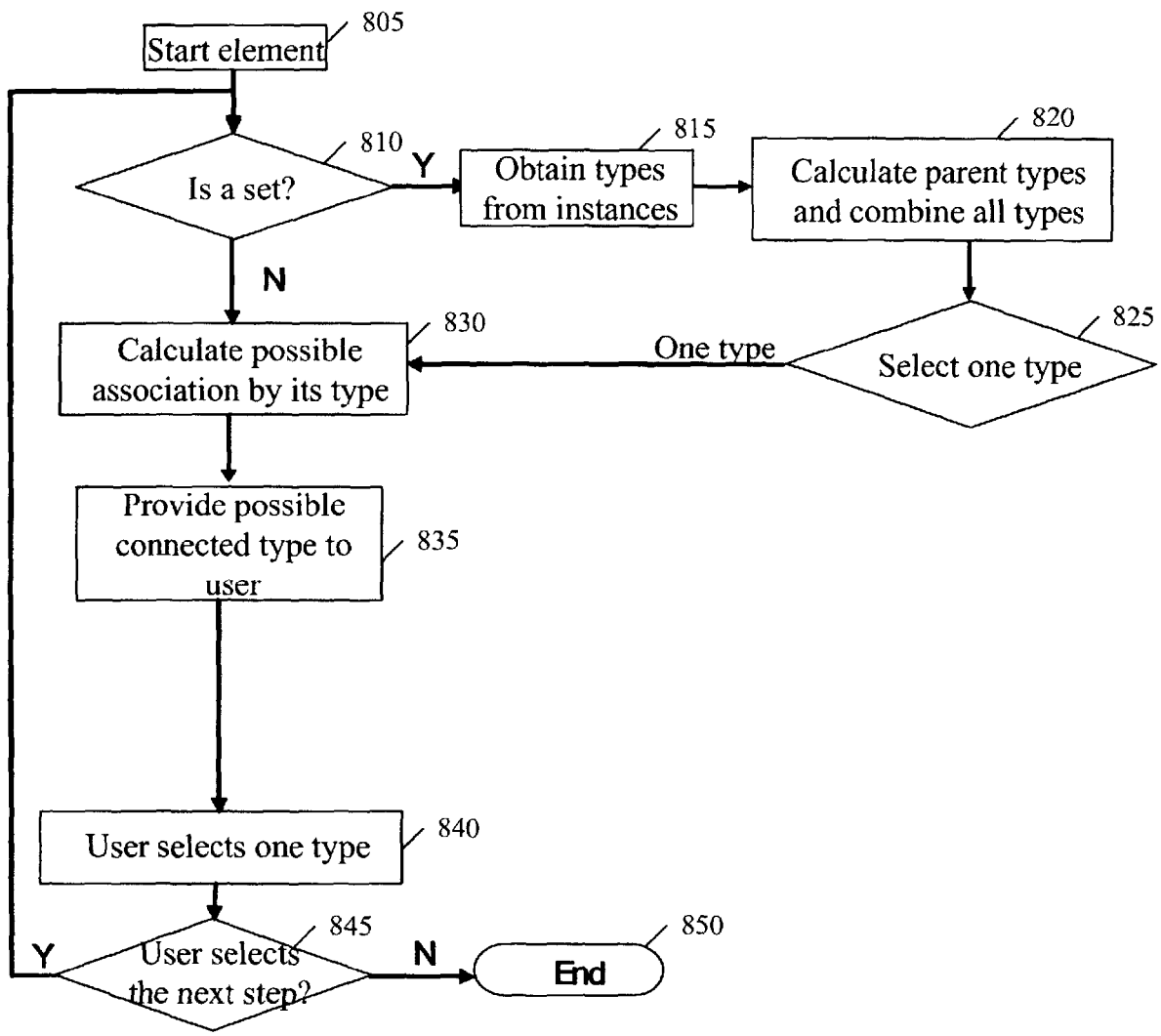
FIG. 8 illustrates the model-level workflow of the navigator helper according to an embodiment of the invention.

The model-level workflow of the navigator helper according to an embodiment of the invention is illustrated below in conjunction with FIG. 8. The flow starts at Block 805, at which the navigation starts from the starting element. The flow proceeds to Step 810, at which it is determined whether the element is a set. If so, then at Step 815 all of the corresponding types are obtained through the instances of the set. As mentioned above, not only does the navigation need to find out every element in the set, but also find out their common parent class, as the constraint on the element set is often applied to the level of the parent class with common attributes. At Step 820 the parent types of the set are calculated and all types are combined. At Step 825, all types (comprising the parent types) are provided to the user as candidates, and one of them is selected by the user. The flow proceeds to Step 830, at which the possible association is calculated through the selected type. The exemplary process related to Step 830 will be described in detail below in conjunction with FIGS. 10A and 10B. If at Step 810 it is determined that the element is not a set, the flow proceeds directly to Step 830. After at Step 830 the calculation of association is completed, at Step 835 the possible connected types are obtained and provided to the user. At Step 840, the user selects one of the types. At Step 845, it is determined whether the user selects the next step of the navigation. If so, the navigation is not finished yet, and the flow returns to Step 810, continuing to determine whether the element related to the next step is a set and repeat the above flow. If not, then the navigation has no next step, and the flow ends at Step 850.

Figure 9:
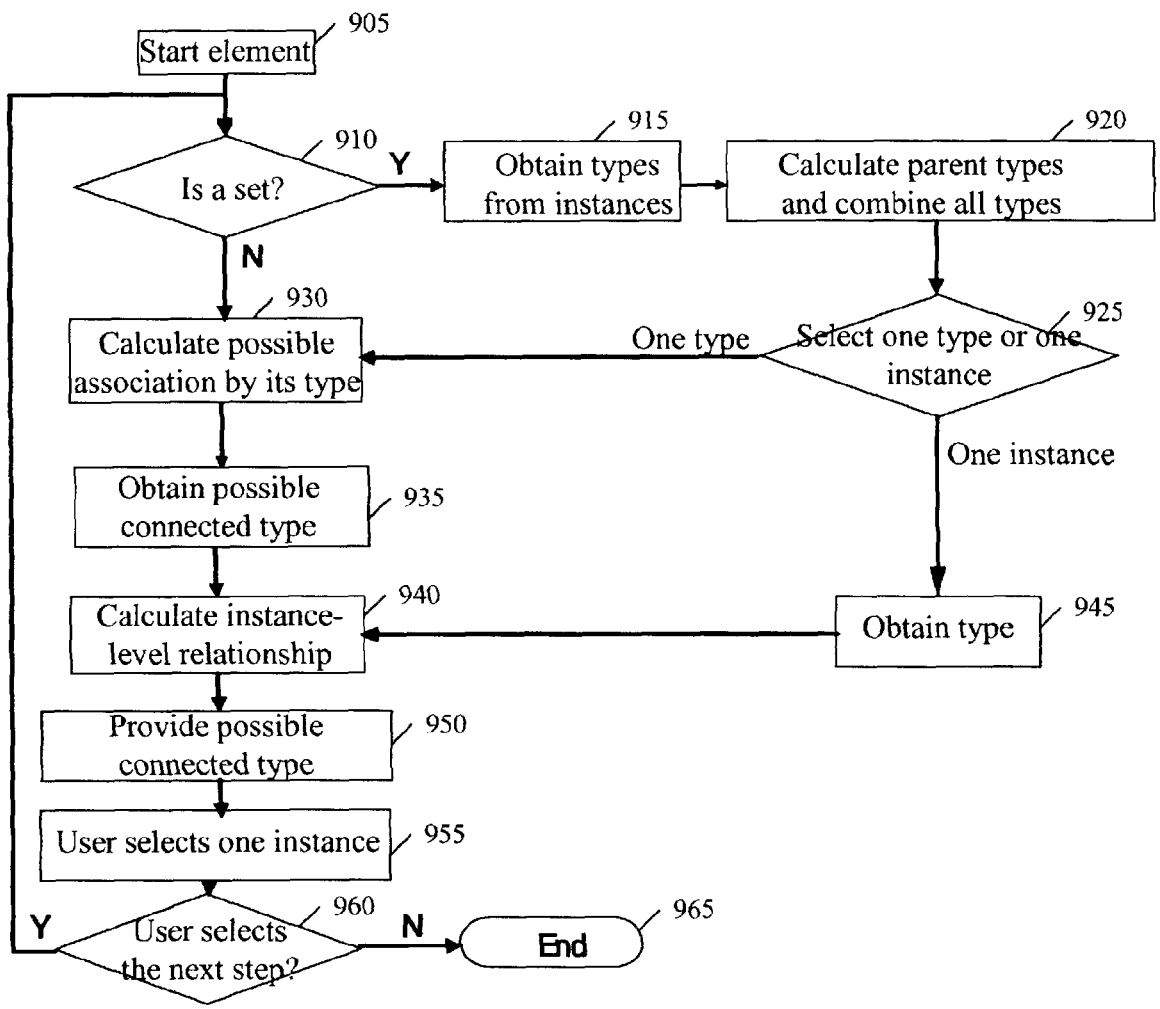
FIG. 9 illustrates the instance-level workflow of the navigator helper according to an embodiment of the invention.

Referring to FIG. 9, the instance-level workflow of the navigator helper according to an embodiment of the invention is illustrated below. At the instance level, the navigator helper needs to get the types by starting from the instance, for example, first calculating the reachable types by proceeding to the model level, then finding out the instances belonging to the reachable types by returning to the instance level. The reason for doing so is that the reachable instances may be not connected with the current element when writing constraints, so that simply checking the elements connecting with the current element may miss some reachable elements. The flow starts at Block 905, at which the navigation starts from the starting element. The flow proceeds to Step 910, at which it is determined whether the element is a set. If so, at Step 915 all of the corresponding types are obtained through the instances of the set. And at Step 920 the parent types of the set are calculated and all types are combined. The above steps are similar to the corresponding steps of FIG. 8. At Step 925, all types (comprising the parent types) and the instances are provided to the user as candidates, and one of them is selected by the user. If the user selects one type, the flow proceeds to Step 930, at which the possible association is calculated through the selected type. The exemplary process related to Step 930 will be described in detail below.

If at Step 910 it is determined that the element is not a set, the flow proceeds directly to Step 930. After at Step 930 the calculation of association is completed, at Step 935 the possible connected types are obtained. At Step 940, the instant-level relationship is calculated according to the possible connected types. At Step 950 the possible connected instances are provided to the user. At Step 955, the user selects one of the instances. At Step 960, it is determined whether the user selects the next step of the navigation. If so, the navigation is not finished yet, and the flow returns to Step 910, continuing to determine whether the element related to the next step is a set and repeat the above flow. If not, then the navigation has no next step, and the flow ends at Step 965.

Returning to Step 925, if the user selects one instance rather than one type, then at Step 945 the type corresponding to the instance is obtained. The flow proceeds directly to Step 940, at which the instant-level relationship is calculated according to the type.

Figure 10A:
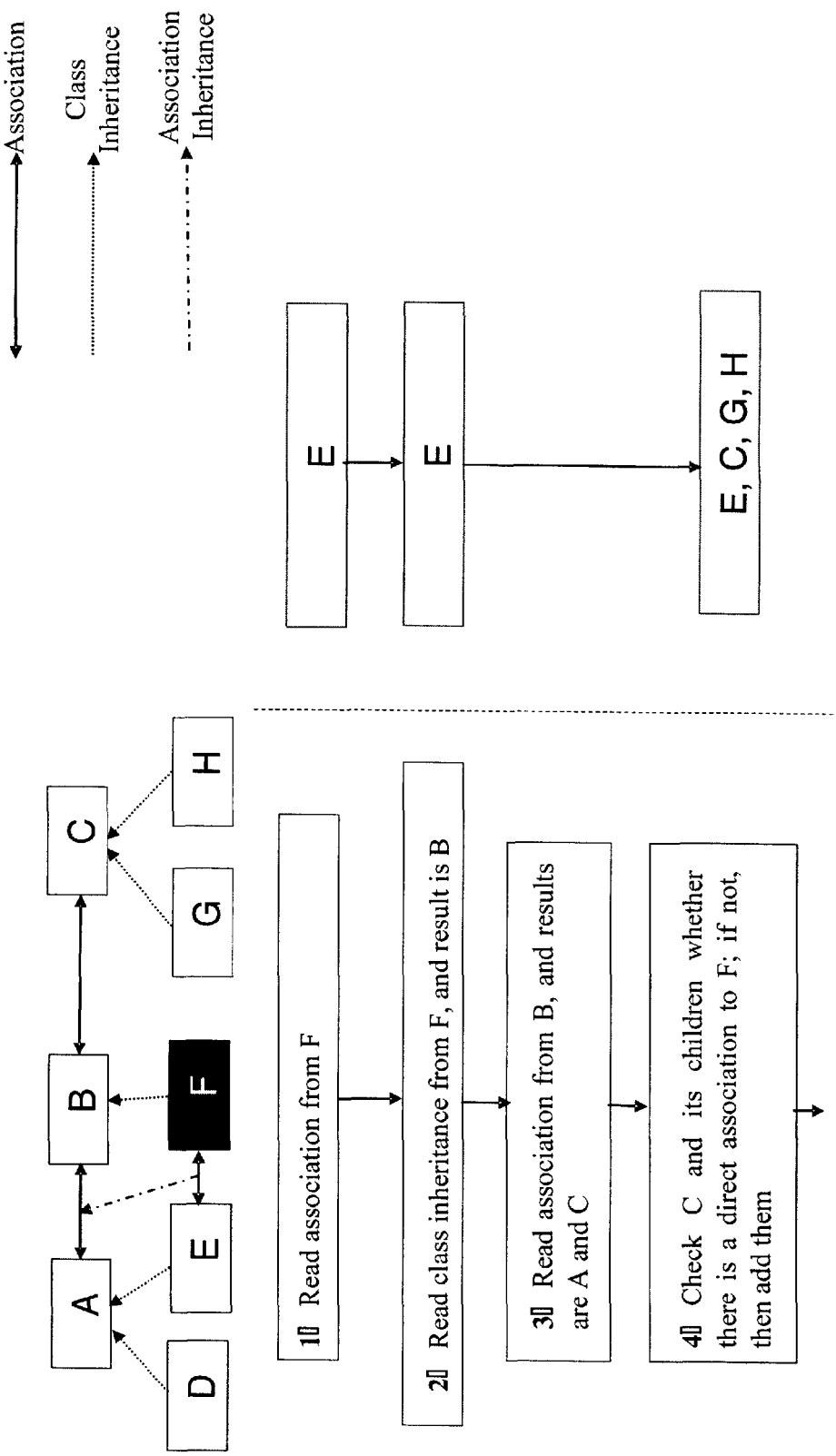
FIGS. 10A and 10B illustrates in detail a process that the possible association is calculated through the selected type.

The model-level and instance-level workflows of the navigation helper are described above respectively, through which the needed navigation may be generated based on user selection. Step 830 in FIG. 8 and Step 930 in FIG. 9 (the possible association is calculated through the selected type) will be described in detail below by means of an example in conjunction with FIGS. 10A and 10B. The model diagram shown in FIG. 10A is searched for the possible navigation helping for "F". The model diagram describes how to find the reachable elements for F by means of this example. As shown in the figure, the selected element is F, E is associated with F, B is a parent class of F, B is associated with A and C, A is a parent class of D and E, and C is a parent class of G and H. In the figure, the solid arrows represent associations, the dashed arrow represents class heritance, and the dotted arrows represent association heritance. The exemplary steps for finding out navigation helping are described in detail hereinbelow.

First step: initially, the association starting from the element F is read. By referencing to the solid arrow between F and E, the result is the element E, which is taken as a candidate of the reachable elements, as shown in the block on the right side of FIG. 10A corresponding to the first step.

Second step: the class heritance starting from the element F is read. By referencing to the dashed arrow between F and B, the result is the element B.

Third step: the association starting from the element B is read. By referencing to the two solid arrows between B and A, C, the results are the elements A and C.

Fourth step: check the element C and its children elements G, H whether there is a direct association to F; in this example, since there is no direct association between F and those three elements, the three elements are added to the candidates of the reachable elements, as shown in the block on the right side of FIG. 10A corresponding to the fourth step.

Figure 10B:
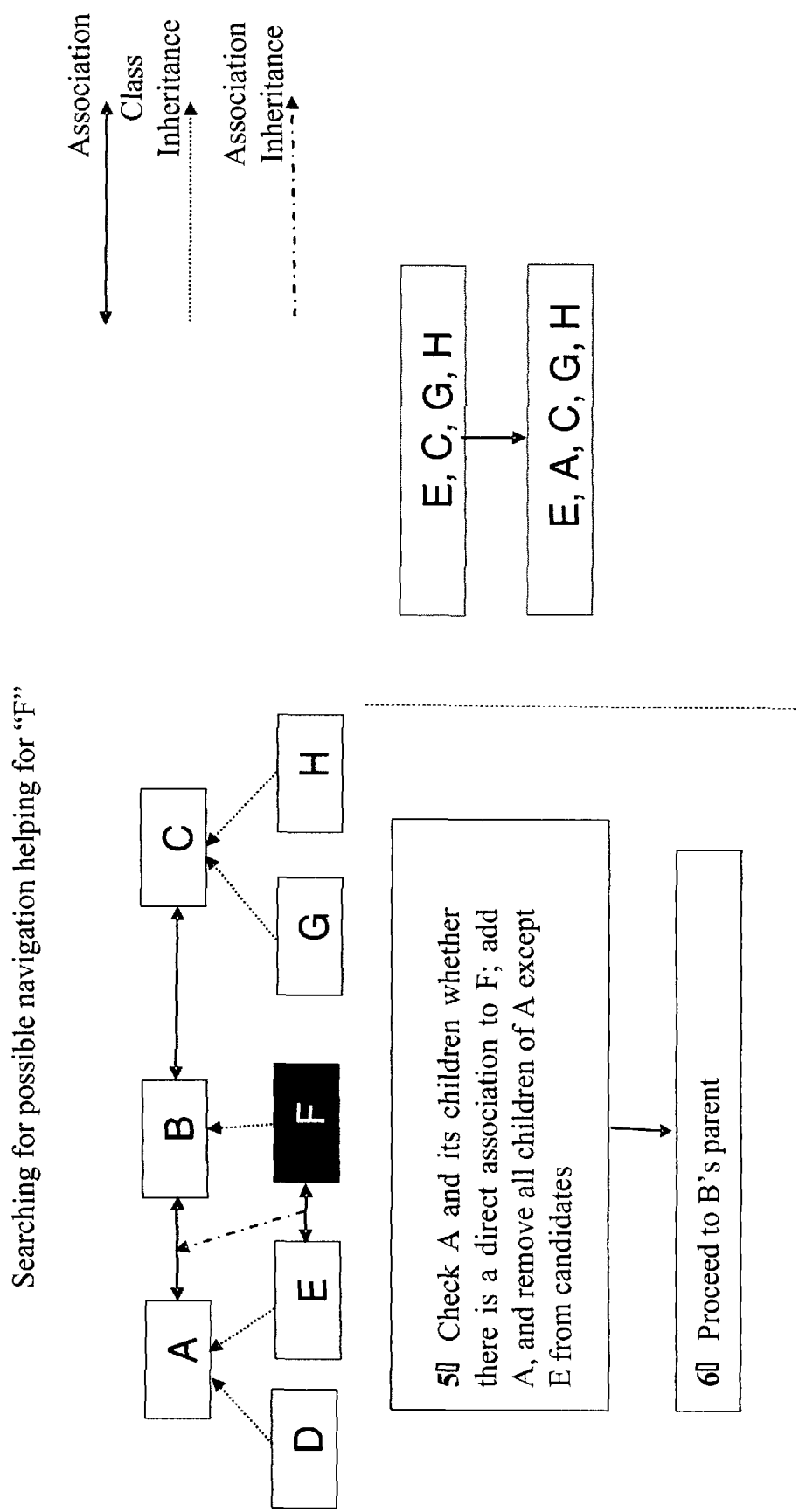

Fifth step: check the element A and its children elements D, E as to whether there is a direct association to F; in this example, since there is a direct association between F and the element E, the parent A of the element E is added to the candidates, as shown in the block on the right side of FIG. 10B corresponding to the fifth step. Except E, all children (the element D) of the element A cannot be taken as the candidate of the reachable elements, as there is a direct association between E and F.

Sixth step: if there is a parent class of the element B, it is further necessary to continue to proceed to the parent class of the element B (not shown for the purpose of simplicity), continue to calculate reachable elements for the parent class of the element B, and repeat the above process. Such a process is recursive constantly. Afterwards, the process of calculating the possible association through the selected type is finished.

The constraint language editor and the navigation helper therein according to an embodiment of the present invention and their workflows are described in detail hereinabove. It is noted that although some embodiments are described with respect to the OCL, those skilled in the art will understand that the embodiments and its technical schemes can be implemented with respect to Schematron or other constraint languages without departing from the spirit and scope of the present invention.

As appreciated by the person with ordinary skills in the art, the present invention may be embodied as a method, a system, and/or a computer program product. Therefore, the present invention can be embodied entirely in hardware, entirely in software, or in a combination of software and hardware. Additionally, the present invention may be embodied as a computer program product contained on machine-readable media where the computer executable program instructions for programming a computer system to execute the process according to an embodiment of the invention are stored. The term "machine-readable media" used herein include any media that provide the computer system with instructions for execution. Such media may take various forms, including but not limited to: non-volatile media, volatile media, and transmission media.

Non-volatile media commonly comprise, for example, floppy disk, floppy magnetic disk, hard disk, magnetic tape, or any other magnetic media, CD-ROM or any other optical media, slotting card or any other physical media with hole pattern, PROM, EPROM, EEPROM, flash memory, any other memory chip or cartridge, or any other media that can be read by the computer system and are appropriate for storing instructions. Additionally, it will be appreciated that each block in the flow chart or block chart and the combination of some blocks may be implemented by some computer program instructions. These computer program instructions may be provided to a general purpose computer, a special purpose computer, or a processor of other programmable data processing device, to produce a machine, in which these instructions, when executed by the computers or the processor of other programmable data processing device, can create the modules that implement the functions indicated by the blocks of the block chart and/or the flow chart.

Although the present invention has been presented and described specifically by reference to the embodiments, it is not intended to be exhaustive or limited the invention in the form disclosed. Many modifications on forms and details will be apparent to those ordinary skill in the art without deviating from the spirit and scope of the invention. The embodiments were chosen and described in order to explain the principles of the invention, the practical application, and to enable others of ordinary skill in the art to understand the invention for various embodiments with various modifications as are suited to the particular use contemplated.

The invention claimed is:

1. A method for determining a navigation path for a constraint language editor, the method comprising:
   accessing at least one software model of at least one software application;
   parsing, with a computer, the software model to determine if there is at least one occurrence of a class inheritance, an association, and an association inheritance is in the software model;

based upon the occurrence of the class inheritance, accessing a data list from a class inheritance database and performing type conversion on the data list which has been accessed;

based upon the occurrence of the association, accessing a data list from an association database; and based upon the occurrence of the association inheritance, accessing a data list from an association inheritance database;

loading the data list based upon the occurrence of the class inheritance, the association, and the association inheritance in the software model into a navigation path calculator;

receiving user input into the navigation path calculator, the user input including a navigation starting point, a navigation ending point; and calculating, with the navigation path calculator, a navigation path with model or instance information including attributes of objects, operations of objects, associations between objects, and generations between objects.

2. The method of claim 1, wherein prior to loading the data list from the class inheritance database and based upon the occurrence of the class inheritance in the software model, performing type conversion on the data list from the class inheritance database.

3. The method of claim 1, wherein prior to calculating the navigation path, the method further comprising:

receiving user input into the navigation calculator, the user input including a navigation ending point, and a maximum step of navigation.

4. The method of claim 1, wherein prior to calculating the navigation path, the method further comprising:

loading an instance into an instance parser, wherein the instance is modeled from the software model;

parsing, with the instance parser, the instance based on an instance connection map that includes relationships between instances, to obtain a connected instance; and loading the connect instance into the navigation path calculator.

5. The method of claim 4, further comprising:

calculating, through a type of a navigation-related element in the instance which has been parsed, an association related to the navigation-related element;

calculating a model-level type corresponding to the instance which has been parsed; and calculating, according to the model-level type, the instance belonging to the type; and wherein the calculating with the navigator path calculator the navigation path includes calculating with the association related to the navigation-related element and the instance belonging to the model-level type.

6. The method of claim 1, further comprising:

based upon the occurrence of a set element in the software model, performing each of obtaining all corresponding types through the instances of a set;

determining common parent types of the instances;

providing all types comprising the parent types to a user as candidates and selecting one of them by the user; and calculating a possible association related to the set element through each of the types.

7. A non-transitory computer readable medium encoded with a program for determining a navigation path for a constraint language editor, the program comprising instructions for:

accessing at least one software model of at least one software application;

parsing, with a computer, the software model to determine if there is at least one occurrence of a class inheritance, an association, and an association inheritance is in the software model;

based upon the occurrence of the class inheritance, accessing a data list from a class inheritance database and performing type conversion on the data list which has been accessed;

based upon the occurrence of the association, accessing a data list from an association database; and based upon the occurrence of the association inheritance, accessing a data list from an association inheritance database;

loading the data list based upon the occurrence of the class inheritance, the association, and the association inheritance in the software model into a navigation path calculator;

receiving user input into the navigation path calculator, the user input including a navigation starting point, a navigation ending point; and calculating, with the navigation path calculator, a navigation path with model or instance information including attributes of objects, operations of objects, associations between objects, and generations between objects.

8. The non-transitory computer readable medium of claim 7, wherein prior to loading the data list from the class inheritance database and based upon the occurrence of the class inheritance in the software model, performing type conversion on the data list from the class inheritance database.

9. The non-transitory computer readable medium of claim 7, wherein prior to calculating the navigation path, further comprising:

receiving user input into the navigation calculator, the user input including a navigation ending point, and a maximum step of navigation.

10. The non-transitory computer readable medium of claim 7, wherein prior to calculating the navigation path, the method further comprising:

loading an instance into an instance parser, wherein the instance is modeled from the software model;

parsing, with the instance parser, the instance based on an instance connection map that includes relationships between instances, to obtain a connected instance; and loading the connect instance into the navigation path calculator.

11. The non-transitory computer readable medium of claim 10, further comprising:

calculating, through a type of a navigation-related element in the instance which has been parsed, an association related to the navigation-related element;

calculating a model-level type corresponding to the instance which has been parsed; and calculating, according to the model-level type, the instance belonging to the type; and wherein the calculating with the navigator path calculator the navigation path includes calculating with the association related to the navigation-related element and the instance belonging to the model-level type.

12. The non-transitory computer readable medium of claim 7, further comprising:

based upon the occurrence of a set element in the software model, performing each of obtaining all corresponding types through the instances of a set;

determining common parent types of the instances;

providing all types comprising the parent types to a user as candidates and selecting one of them by the user; and calculating a possible association related to the set element through each of the types.

13. An information processing system for determining a navigation path for a constraint language editor, the information processing system comprising:
- a memory;
- a processor communicatively coupled to the memory; and
- a navigation helper coupled to the memory and the processor, the navigation helper being configured for:
  - accessing at least one software model of at least one software application;
  - parsing, with a computer, the software model to determine if there is at least one occurrence of a class inheritance, an association, and an association inheritance is in the software model;
  - based upon the occurrence of the class inheritance, accessing a data list from a class inheritance database and performing type conversion on the data list which has been accessed;
  - based upon the occurrence of the association, accessing a data list from an association database; and
  - based upon the occurrence of the association inheritance, accessing a data list from an association inheritance database;
  - loading the data list based upon the occurrence of the class inheritance, the association, and the association inheritance in the software model into a navigation path calculator;
  - receiving user input into the navigation path calculator, the user input including a navigation starting point, a navigation ending point; and
  - calculating, with the navigation path calculator, a navigation path with model or instance information including attributes of objects, operations of objects, associations between objects, and generations between objects.

14. The information processing system of claim 13, wherein prior to loading the data list from the class inheritance database and based upon the occurrence of the class inheritance in the software model, performing type conversion on the data list from the class inheritance database.

15. The information processing system of claim 13, wherein prior to calculating the navigation path, further comprising:
- receiving user input into the navigation calculator, the user input including a navigation ending point, and a maximum step of navigation.

16. The information processing system of claim 13, wherein prior to calculating the navigation path, the method further comprising:
- loading an instance into an instance parser, wherein the instance is modeled from the software model;
- parsing, with the instance parser, the instance based on an instance connection map that includes relationships between instances, to obtain a connected instance; and
- loading the connect instance into the navigation path calculator.

17. The information processing system of claim 16, further comprising:
- calculating, through a type of a navigation-related element in the instance which has been parsed, an association related to the navigation-related element;
- calculating a model-level type corresponding to the instance which has been parsed; and
- calculating, according to the model-level type, the instance belonging to the type; and wherein the calculating with the navigator path calculator the navigation path includes calculating with the association related to the navigation-related element and the instance belonging to the model-level type.

18. The information processing system of claim 13, further comprising:
- based upon the occurrence of a set element in the software model, performing each of
  - obtaining all corresponding types through the instances of a set;
  - determining common parent types of the instances;
  - providing all types comprising the parent types to a user as candidates and selecting one of them by the user; and
  - calculating a possible association related to the set element through each of the types.

* * * * *